US010523109B2

(12) United States Patent
Noppakunkajorn et al.

(10) Patent No.: US 10,523,109 B2
(45) Date of Patent: Dec. 31, 2019

(54) VEHICLE CAPACITOR ASSEMBLY

(71) Applicant: Ford Global Technologies, LLC, Dearborn, MI (US)

(72) Inventors: Jukkrit Noppakunkajorn, Canton, MI (US); Sudhir Kumar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/871,472

(22) Filed: Jan. 15, 2018

(65) Prior Publication Data

US 2019/0222111 A1 Jul. 18, 2019

(51) Int. Cl.
| | |
|---|---|
| *H02M 1/14* | (2006.01) |
| *H01G 4/30* | (2006.01) |
| *H01G 2/08* | (2006.01) |
| *H01G 2/14* | (2006.01) |
| *B60W 20/10* | (2016.01) |
| *H01G 4/20* | (2006.01) |
| *H01G 4/236* | (2006.01) |
| *H02M 7/10* | (2006.01) |
| *H02M 7/48* | (2007.01) |

(52) U.S. Cl.
CPC ............ *H02M 1/143* (2013.01); *B60W 20/10* (2013.01); *H01G 4/206* (2013.01); *H01G 4/236* (2013.01); *H01G 4/306* (2013.01); *H02M 7/103* (2013.01); *H02M 7/4826* (2013.01); *H01M 2220/20* (2013.01)

(58) Field of Classification Search
USPC ......... 361/274.3, 701, 709, 514, 274.2, 699, 361/698, 301.4
See application file for complete search history.

(56) References Cited

U.S. PATENT DOCUMENTS

| | | |
|---|---|---|
| 5,550,705 A | 8/1996 | Moncrieff |
| 6,493,206 B1 | 12/2002 | King |
| 2014/0285969 A1* | 9/2014 | Kojima ............... H01G 2/14 |
| | | 361/689 |
| 2016/0049258 A1* | 2/2016 | Kojima ............... H01G 4/385 |
| | | 361/301.4 |
| 2016/0099109 A1 | 4/2016 | Saito |

FOREIGN PATENT DOCUMENTS

JP 2013038298 A * 2/2013 ............... H01G 2/08

* cited by examiner

*Primary Examiner* — Eric W Thomas
*Assistant Examiner* — Arun Ramaswamy
(74) *Attorney, Agent, or Firm* — David Kelley; Brooks Kushman, P.C.

(57) ABSTRACT

An electrified vehicle capacitor assembly including a film capacitor assembly and a support structure is provided. The film capacitor assembly may include a stack of alternating electrodes and film layers. The electrodes may be offset from one another to alternatively contact opposing terminals. The support structure may include coolant channels and may be arranged to orient the film capacitor assembly adjacent an inverter assembly and such that each is in conductive thermal communication with at least one of the coolant channels. The film capacitor assembly further includes a stack of alternating metal foils and film layers disposed between a pair of contact layers, a pair of terminals, and a first thermal plate. Each of the pair of terminals is disposed on an outer side of one of each of the pair of contact layers.

15 Claims, 4 Drawing Sheets

VEHICLE CAPACITOR ASSEMBLY

TECHNICAL FIELD

The present disclosure relates to capacitor assemblies for automotive vehicles.

BACKGROUND

Electrified vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery. Direct current (DC) link capacitors operate to reduce ripple current between a HVDC source and an inverter load and also provide reactive power to an electric motor. The inverter is typically located near the electric motor and is exposed to high temperatures. These high temperatures create design and component packaging challenges.

SUMMARY

A capacitor assembly includes a film capacitor and a first thermal plate. The film capacitor includes a stack of alternating metal foils and film layers disposed between a pair of contact layers orthogonal to the stack, and a pair of terminals each disposed on an outer side of one of each of the contact layers. The first thermal plate is arranged for direct conductive thermal communication with the metal foils and film layers. The first thermal plate may be oriented parallel with the metal foils and located beneath the stack, contact layers, and terminals. The assembly may include a second thermal plate oriented parallel with the metal foils and located above the stack, contact layers, and terminals. The first thermal plate may be oriented parallel with the contact layers and located on a side of one of the contact layers. The assembly may include a second thermal plate oriented parallel with the contact layers and located on another side of the other of the contact layers. The assembly may include an electrical insulation and thermal conduction layer disposed between at least one of the terminals and the first thermal plate.

An electrified vehicle capacitor assembly includes a film capacitor assembly and a support structure. The film capacitor assembly includes a stack of alternating electrodes and film layers. The electrodes are offset from one another to alternatively contact opposing terminals. The support structure includes coolant channels and is arranged to orient the film capacitor assembly adjacent an inverter assembly and such that each is in conductive thermal communication with at least one of the coolant channels. The film capacitor assembly further includes a stack of alternating metal foils and film layers disposed between a pair of contact layers, a pair of terminals, and a first thermal plate. Each of the pair of terminals is disposed on an outer side of one of each of the pair of contact layers. The first thermal plate is arranged for direct conductive thermal communication with the metal foils and film layers. The first thermal plated may be oriented parallel with the metal foils and located beneath the stack, contact layers, and terminals. The assembly may include a second thermal plate oriented parallel with the metal foils and located above the stack, contact layers, and terminals. The first thermal plate may be oriented parallel with the contact layers and located on a side of one of the contact layers. The assembly may include a second thermal plate oriented parallel with the contact layers and located on another side of the other of the contact layers.

A vehicle inverter assembly includes a radiator-style thermal plate assembly, a capacitor assembly, and one or more power cards. The radiator-style thermal plate assembly includes first and second vertical components having vertical coolant channels in fluid communication with horizontal coolant channels of one or more horizontal components. The capacitor assembly is disposed upon an upper horizontal component of the one or more horizontal components and between upper portions of each of the first and second vertical components. Each of the one or more power cards is disposed between the one or more horizontal components. The vertical coolant channels are arranged with the capacitor assembly for direct thermal conductive communication and the horizontal coolant channels are arranged with the one or more power cards for direct thermal conductive communication. The capacitor assembly may include a stack of alternating metal foils and film layers disposed between a pair of contact layers, a pair of terminals, and a first thermal plate. Each of the pair of terminals is disposed on an outer side of one of each of the contact layers. The first thermal plate is arranged for direct conductive thermal communication with the metal foils and film layers. The first thermal plated may be oriented parallel with the metal foils and located beneath the stack, contact layers, and terminals. The vehicle inverter assembly may include a second thermal plate oriented parallel with the metal foils and located above the stack, contact layers, and terminals. The first thermal plate may be oriented parallel with the contact layers and located on a side of one of the contact layers. The vehicle inverter assembly may include a second thermal plate oriented parallel with the contact layers and located on another side of the other of the contact layers.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
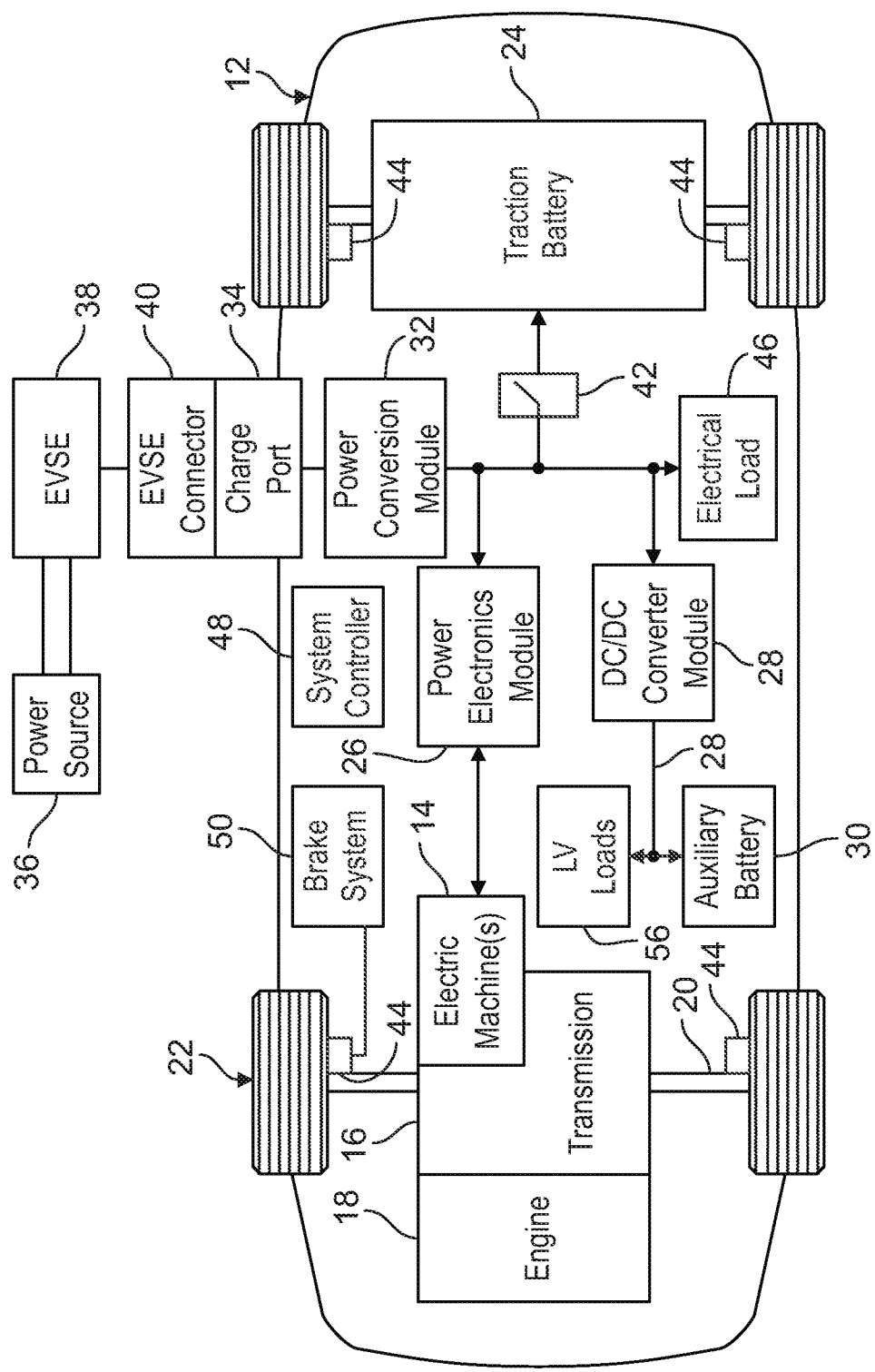
FIG. 1 is a schematic diagram illustrating an example of a hybrid vehicle.

FIG. 1 illustrates an example of an electrified vehicle 12 that may be referred to as a plug-in hybrid-electric vehicle (PHEV). A plug-in hybrid-electric vehicle 12 may comprise one or more electric machines 14 mechanically coupled to a gearbox or hybrid transmission 16. The electric machines 14 may be capable of operating as a motor and a generator. In addition, the hybrid transmission 16 is mechanically coupled to an engine 18. The hybrid transmission 16 is also mechanically coupled to a drive shaft 20 that is mechanically coupled to the wheels 22. The electric machines 14 may provide propulsion and deceleration capability when the engine 18 is turned on or off. The electric machines 14 may also act as generators and provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. The electrified vehicle 12 may also be a battery electric vehicle (BEV). In a BEV configuration, the engine 18 may not be present. In other configurations, the electrified vehicle 12 may be a full hybrid-electric vehicle (FHEV) without plug-in capability.

A battery pack or traction battery 24 stores energy that may be used by the electric machines 14. The traction battery 24 may provide a high voltage direct current (DC) output. A contactor module 42 may include one or more contactors configured to isolate the traction battery 24 from a high-voltage bus 52 when opened and connect the traction battery 24 to the high-voltage bus 52 when closed. The high-voltage bus 52 may include power and return conductors for carrying current over the high-voltage bus 52. The contactor module 42 may be located in the traction battery 24. One or more power electronics modules 26 (also referred to as an inverter) may be electrically coupled to the high-voltage bus 52. The power electronics modules 26 are electrically coupled to the electric machines 14 and provide the ability to bi-directionally transfer energy between the traction battery 24 and the electric machines 14. For example, a traction battery 24 may provide a DC voltage while the electric machines 14 may operate with a three-phase alternating current (AC). The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24.

In addition to providing energy for propulsion, the traction battery 24 may provide energy for other vehicle electrical systems. The vehicle 12 may include a DC/DC converter module 28 that converts the high voltage DC output from the high-voltage bus 52 to a low-voltage DC level of a low-voltage bus 54 that is compatible with low-voltage loads 56. An output of the DC/DC converter module 28 may be electrically coupled to an auxiliary battery 30 (e.g., a 12V battery) for charging the auxiliary battery 30. The low-voltage loads 56 may be electrically coupled to the auxiliary battery 30 via the low-voltage bus 54. One or more high-voltage electrical loads 46 may be coupled to the high-voltage bus 52. The high-voltage electrical loads 46 may have an associated controller that operates and controls the high-voltage electrical loads 46 when appropriate. Examples of high-voltage electrical loads 46 may be a fan, an electric heating element and/or an air-conditioning compressor.

The electrified vehicle 12 may be configured to recharge the traction battery 24 via an external power source 36. The external power source 36 may include a connection to an electrical outlet. The external power source 36 may be electrically coupled to a charge station or an electric vehicle supply equipment (EVSE) 38. The external power source 36 may be an electrical power distribution network or grid as provided by an electric utility company. The EVSE 38 may provide circuitry and controls to regulate and manage the transfer of energy between the external power source 36 and the vehicle 12. The external power source 36 may provide DC or AC electric power to the EVSE 38. The EVSE 38 may have a charge connector 40 for coupling to a charge port 34 of the vehicle 12. The charge port 34 may be any type of suitable port configured to transfer power from the EVSE 38 to the vehicle 12. The charge port 34 may be electrically coupled to an on-board power conversion module or charger 32. The charger 32 may condition the power supplied from the EVSE 38 to provide appropriate voltage and current levels to the traction battery 24 and the high-voltage bus 52. The charger 32 may interface with the EVSE 38 to coordinate the delivery of power to the vehicle 12. The EVSE connector 40 may have pins to mate with corresponding recesses of the charge port 34.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. The brake system 50 is connected to the wheel brakes 44. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

Electronic modules in the vehicle 12 may communicate via one or more vehicle networks. The one or more vehicle networks may include a plurality of channels for communication. One channel of the vehicle network may be a serial bus such as a controller area network (CAN). One of the channels of the vehicle network may include an Ethernet network. Additional channels of the one or more vehicle networks may include discrete connections between modules and may include power signals from the auxiliary battery 30. Different signals may be transferred over different channels of the one or more vehicle networks. For example, video signals may be transferred over a high-speed channel (e.g., an Ethernet channel) while control signals may be transferred over CAN or discrete signals. The vehicle network may include any hardware and software components that aid in transferring signals and data between modules. The one or more vehicle networks are not shown in FIG. 1 but it may be implied that the one or more vehicle networks may connect to any electronic modules that are present in the vehicle 12. A vehicle system controller (VSC) 48 may be present to coordinate the operation of the various components.

Figure 2:
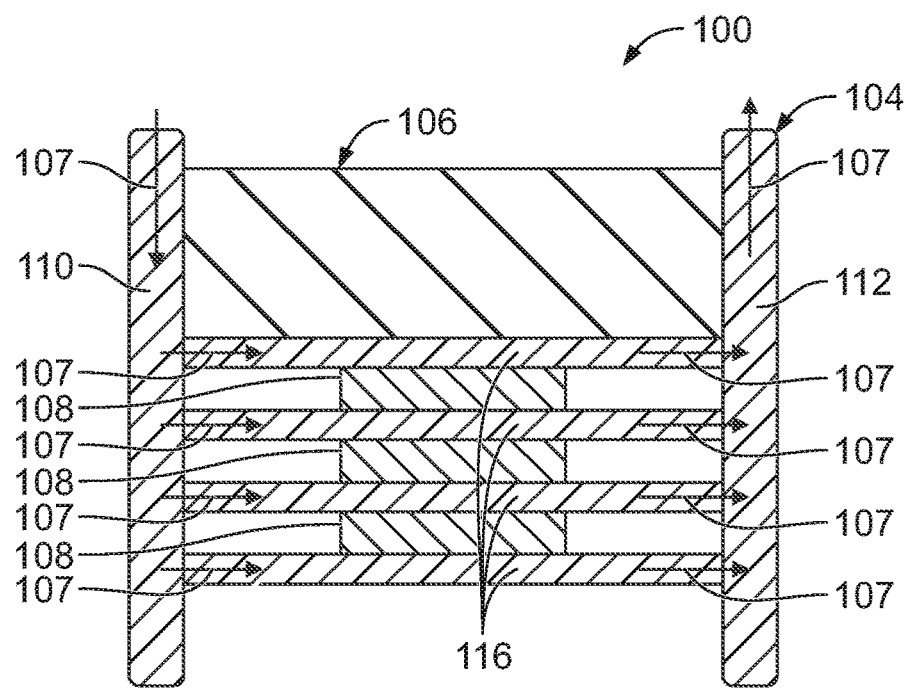
FIG. 2 is a top view, in cross-section, of an example of a portion of an inverter assembly.

FIG. 2 illustrates an example of a portion of an electrified vehicle inverter assembly, referred to generally as an inverter assembly 100. The inverter assembly 100 may accommodate systems including a single inverter or systems including more than one inverter. The inverter assembly 100 includes a thermal plate assembly 104, a capacitor assembly 106, and one or more power cards 108. The thermal plate assembly 104 may be styled similar to a radiator shape and include a first vertical component 110, a second vertical component 112, and a plurality of horizontal components 116. The first vertical component 110 may be an inlet coolant pipe and the second vertical component 112 may be an outlet coolant pipe. In one example, each of the plurality of horizontal components 116 may be a thermal plate. Each component of the thermal plate assembly 104 may include a channel for coolant to flow therethrough as represented by arrows 107. Each of the channels are in fluid communication with one another.

The capacitor assembly 106 may operate to limit DC-bus voltage ripple, to reduce ripple current between an HVDC source and inverter load, and to provide reactive power to an electric motor. The capacitor assembly 106 may include electrodes, film, contact layers, and terminals. The capacitor assembly 106 may be disposed upon one of the horizontal components 116 and between the first vertical component 110 and the second vertical component 112 for conductive thermal communication with coolant flowing through the channels.

Each of the one or more power cards 108 may be disposed between two of the plurality of horizontal components 116 for conductive thermal communication with coolant flowing through the channels.

Figure 3:
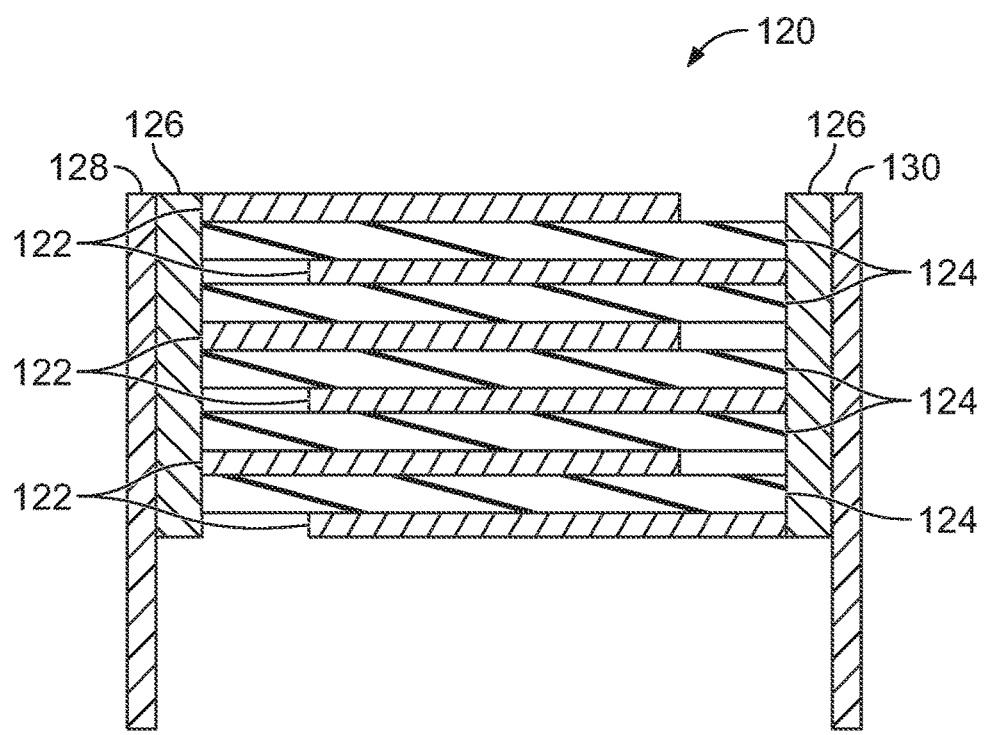
FIG. 3 is a top view, in cross-section, of a portion of an example of a capacitor assembly.

FIG. 3 illustrates an example of a portion of a capacitor assembly, referred to generally as a capacitor assembly 120. The capacitor assembly 120 may include metal foil layers 122 which may also be referred to as electrodes 122, film layers 124, contact layers 126, a first terminal 128, and a second terminal 130. The electrodes 122 and the film layers 124 may be alternatively stacked and disposed between the contact layers 126. Each of the electrodes 122 is arranged within the stack so that only one end of each electrode 122 contacts one of the contact layers 126. Each end of each of the film layers 124 is arranged within the stack for contact with one of the contact layers 126. The first terminal 128 and the second terminal 130 may be electrically connected to one or more vehicle components to transfer power.

One of the first terminal 128 and the second terminal 130 is positively charged and the other is negatively charged. The capacitor assembly 120 may be mounted to a thermal plate assembly for thermal management purposes as further shown in FIGS. 4A through 5B.

Figure 4A:
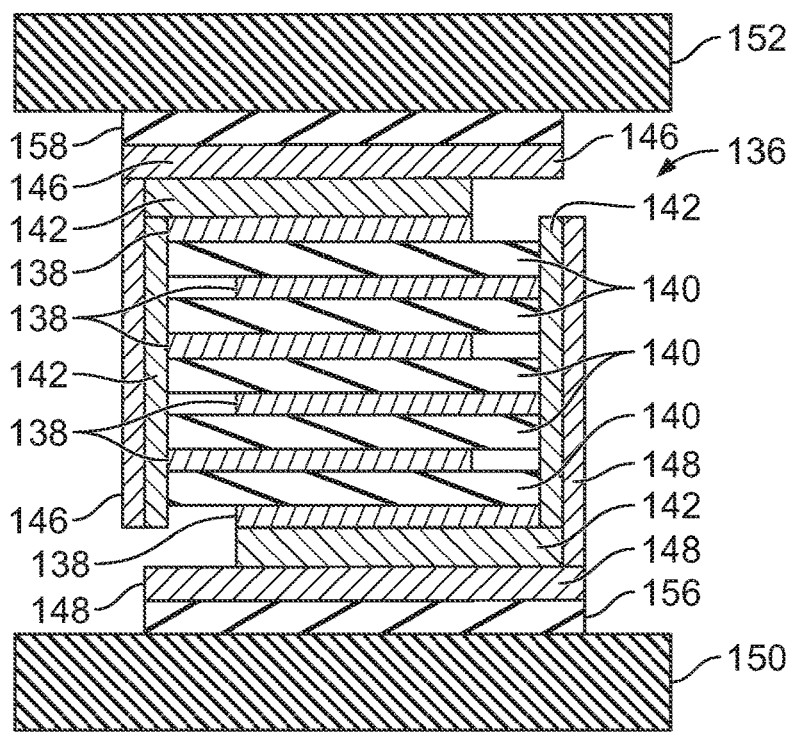
FIG. 4A is a top view, in cross-section, of the capacitor assembly of FIG. 4 shown with an example of a portion of a thermal management support structure.

FIG. 4A illustrates an example of a capacitor assembly mounted to an example of a portion of a thermal management assembly. A capacitor assembly 136 may include metal foil layers 138 which may also be referred to as electrodes 138, film layers 140, contact layers 142, a first terminal 146, and a second terminal 148. The electrodes 138 and the film layers 140 may be alternatively stacked and disposed between the contact layers 142. The contact layers 142 may be arranged orthogonal to the stack. Each of the electrodes 138 is arranged within the stack so that only one end of each electrode 138 contacts one of the contact layers 142. Each end of each of the film layers 140 is arranged within the stack for contact with one of the contact layers 142.

The thermal management assembly may include a first thermal plate 150 for conductive thermal communication with the capacitor assembly 136. Optionally, the thermal management assembly may include a second thermal plate 152 for conductive thermal communication with the capacitor assembly 136. For example, each of the first thermal plate 150 and the second thermal plate 152 may include a channel for coolant to flow therethrough and to draw heat from the capacitor assembly 136.

An electrically insulating and thermally conducting first layer 156 may be disposed between the second terminal 148 and the first thermal plate 150 and an electrically insulating and thermally conducting second layer 158 may be disposed between the first terminal 146 and the second thermal plate 152. In this example, each of the first thermal plate 150 and the second thermal plate 152 is oriented parallel to the electrodes 138 and the film layers 140.

Figure 4B:
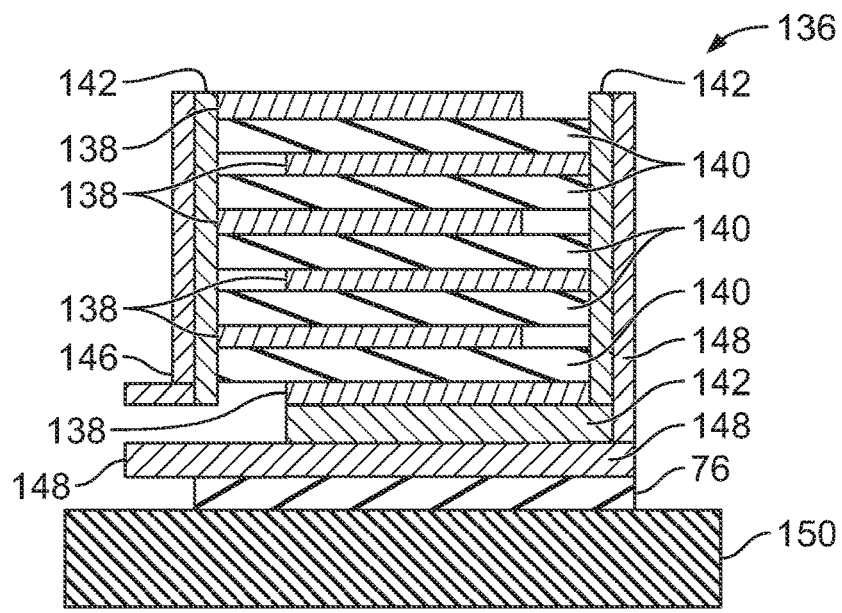
FIG. 4B is a top view, in cross-section, of a portion of a capacitor assembly shown with another example of a portion of a thermal management support structure.

FIG. 4B illustrates an example of the capacitor assembly 136 in an embodiment including only the first thermal plate 150. This embodiment also includes an alternative configuration for the first terminal 146 and includes only one thermally conducting layer such as the thermally conducting second layer 158. Available packaging space is one reason this embodiment may be preferable instead of an embodiment with two thermal plates.

Figure 5A:
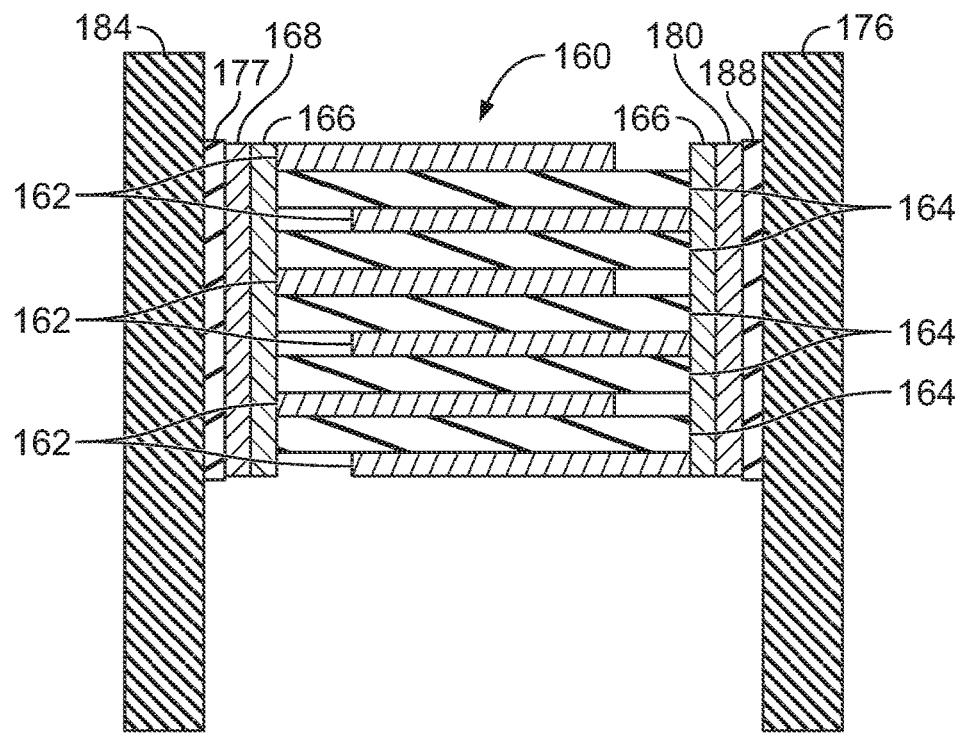
FIG. 5A is a top view, in cross-section, of an example of a portion of a capacitor assembly shown with an example of a portion of a thermal management support structure.

FIG. 5A illustrates an example of a portion of a capacitor assembly mounted to an example of a portion of a thermal management system. A capacitor assembly 160 may include metal foil layers 162 which may also be referred to as electrodes 162, film layers 164, contact layers 166, a first terminal 168, and a second terminal 180. The electrodes 162 and the film layers 164 may be alternatively stacked and disposed between the contact layers 166. Each of the electrodes 162 is arranged within the stack that only one end of each electrode 162 contacts one and not the other of the contact layers 142. Each end of each of the film layers 164 is arranged within the stack for contact with one of the contact layers 166.

The thermal management assembly may include a first thermal plate 184 for conductive thermal communication with the capacitor assembly 160. Optionally, the thermal management assembly may include a second thermal plate 176 for conductive thermal communication with the capacitor assembly 160. For example, each of the first thermal plate 184 and the second thermal plate 96 may include a channel for coolant to flow therethrough and to draw heat from the capacitor assembly 160.

An electrically insulating and thermally conductive first layer 177 may be disposed between the first terminal 168 and the first thermal plate 184 and an electrically insulating and thermally conductive second layer 188 may be disposed between the second terminal 180 and the second thermal plate 96. In this example, each of the first thermal plate 184 and the second thermal plate 96 is oriented parallel to the contact layers 166.

Figure 5B:
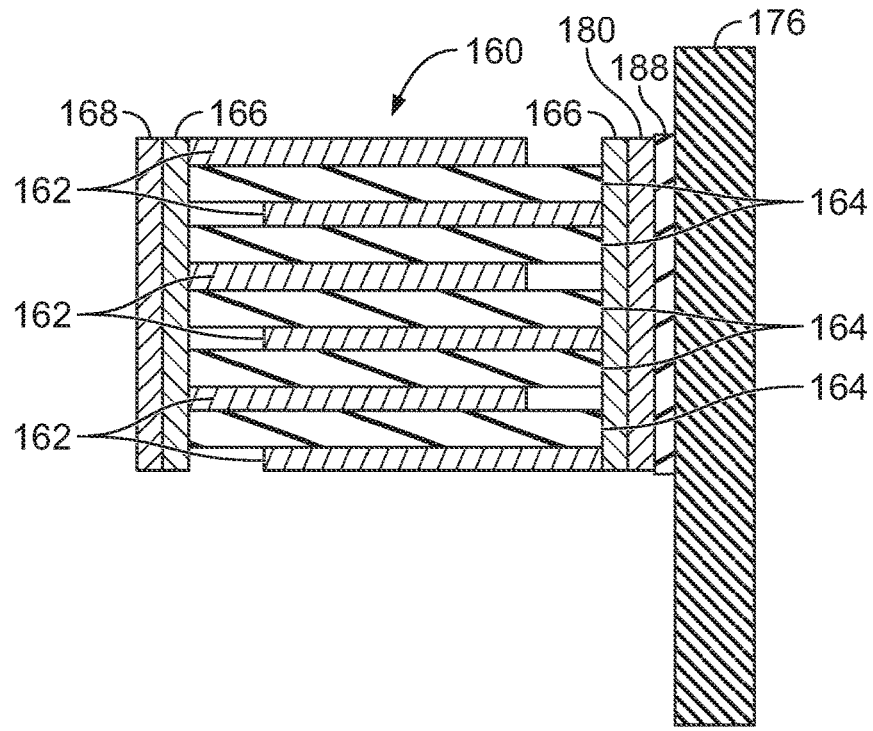
FIG. 5B is a top view, in cross-section, of an example of a portion of a capacitor assembly shown within another example of a portion of a thermal management support structure.

FIG. 5B illustrates an example of the capacitor assembly 160 in an embodiment including only the first thermal plate 184. This embodiment includes only one thermally conductive layer such as the thermally conductive second layer 188. Available packaging space is one reason this embodiment may be preferable instead of an embodiment with two thermal plates.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle inverter assembly comprising:
a radiator-style thermal plate assembly including first and second vertical components having vertical coolant channels in fluid communication with horizontal coolant channels of one or more horizontal components;
a capacitor assembly disposed upon an upper horizontal component of the one or more horizontal components and between upper portions of each of the first and second vertical components; and
one or more power cards disposed between the one or more horizontal components,
wherein the vertical coolant channels are arranged with the capacitor assembly for direct thermal conductive communication and the horizontal coolant channels are arranged with the one or more power cards for direct thermal conductive communication.

2. The assembly of claim 1, wherein the capacitor assembly comprises:
a stack of alternating metal foils and film layers disposed between a pair of contact layers;
a pair of terminals each disposed on an outer side of one of each of the contact layers; and
a first thermal plate arranged for direct conductive thermal communication with the metal foils and film layers.

3. The assembly of claim 2, wherein the first thermal plated is oriented parallel with the metal foils and located beneath the stack, contact layers, and terminals.

4. The assembly of claim 3 further comprising a second thermal plate oriented parallel with the metal foils and located above the stack, contact layers, and terminals.

5. The assembly of claim 2, wherein the first thermal plate is oriented parallel with the contact layers and located on a side of one of the contact layers.

6. The assembly of claim 5 further comprising a second thermal plate oriented parallel with the contact layers and located on another side of the other of the contact layers.

7. A vehicle inverter assembly comprising:
a thermal plate assembly including first and second vertical components having vertical coolant channels in fluid communication with horizontal coolant channels of a plurality of horizontal components;
a capacitor assembly disposed between the first and second vertical components in direct thermal conductive communication with at least one vertical coolant channel; and
at least one power card disposed between an adjacent pair of horizontal components in direct thermal conductive communication with at least one horizontal coolant channel.

8. The assembly of claim 7, wherein capacitor assembly comprises:
a stack of alternating metal foils and film layers disposed between a pair of contact layers;
a pair of terminals each disposed on an outer side of one of the contact layers; and
at least one thermal plate arranged for direct conductive thermal communication with the metal foils and film layers.

9. The assembly of claim 8 wherein the at least one thermal plate includes a first thermal plate oriented parallel with the metal foils and located beneath the stack, and a second thermal plate oriented parallel with the metal foils and located above the stack.

10. The assembly of claim 8, wherein the at least one thermal plate includes a first thermal plate oriented orthogonal to the stack and located on one of the pair of contact layers, and a second thermal plate orthogonal to the stack and located on an other of the pair of contact layers.

11. A thermal plate assembly including first and second vertical components having vertical coolant channels in fluid communication with horizontal coolant channels of a plurality of horizontal components;
at least one power card disposed between an adjacent pair of horizontal components in direct thermal conductive communication with at least one horizontal coolant channel; and
a capacitor assembly disposed between the first and second vertical components in direct thermal conductive communication with al least one vertical coolant channel, the capacitor assembly including:
a stack of alternating electrode layers and film layers, wherein the electrodes are offset from one another to alternatively contact opposing contact layers,
a pair of terminals each disposed on an outer side of one of each of the opposing contact layers, and
and at least one thermal plate arranged for direct conductive thermal communication with the metal foils and film layers.

12. The assembly of claim 11 wherein the at least one thermal plate includes a first thermal plate oriented parallel with the electrode layers and located beneath the stack.

13. The assembly of claim 12 wherein the at least one thermal plate includes a second thermal plate oriented parallel with the electrode layers and located above the stack.

14. The assembly of claim 11 wherein the at least one thermal plate includes a first thermal plate oriented orthogonal to the stack and located on one of the opposing contact layers.

15. The assembly of claim 14 wherein and the at least one thermal plate includes a second thermal plate orthogonal to the stack and located on an other of the opposing contact layers.

* * * * *